United States Patent [19]
Brentrup et al.

[11] Patent Number: 5,827,460
[45] Date of Patent: Oct. 27, 1998

[54] PRODUCTION OF FIBER COMPOSITE

[75] Inventors: Karl-Ludwig Brentrup, Osnabrueck; Friedrich Heinrich Erfmann, Lotte, both of Germany

[73] Assignee: BASF Aktiengesellschaft, Ludwigshafen, Germany

[21] Appl. No.: 847,988

[22] Filed: Apr. 21, 1997

Related U.S. Application Data

[63] Continuation of Ser. No. 395,358, Feb. 28, 1995, abandoned, which is a continuation of Ser. No. 623,567, Dec. 7, 1990, abandoned.

[30] Foreign Application Priority Data

Nov. 9, 1990 [DE] Germany .......................... 40 35 610.8

[51] Int. Cl.⁶ .............................. B32B 27/32; B29C 43/28
[52] U.S. Cl. ............................... 264/171.23; 264/172.19; 264/257; 264/325; 425/371
[58] Field of Search .................... 156/583.5; 264/171.23, 264/172.19, 257, 258, 324, 325; 425/371

[56] References Cited

U.S. PATENT DOCUMENTS

| | | | |
|---|---|---|---|
| 594,583 | 11/1897 | Wood | 425/371 |
| 1,465,326 | 8/1923 | Zimmer | 425/371 |
| 2,866,730 | 12/1958 | Potchen et al. | 425/371 |
| 3,684,645 | 8/1972 | Temple et al. | 264/257 |
| 3,708,566 | 1/1973 | Junker et al. | 264/172.19 |
| 3,740,177 | 6/1973 | Hoyt et al. | 264/172.19 |
| 4,309,375 | 1/1982 | Rabenecker | 264/174 |
| 4,331,500 | 5/1982 | Gersbeck et al. | 156/583.5 |
| 4,573,404 | 3/1986 | Held | 425/371 |
| 4,714,015 | 12/1987 | Stabler | 425/371 |
| 4,755,334 | 7/1988 | Grimm et al. | 425/371 |
| 4,877,392 | 10/1989 | De Brock | 425/371 |
| 5,057,175 | 10/1991 | Ashton | 156/583.5 |

FOREIGN PATENT DOCUMENTS

| | | |
|---|---|---|
| 2948235 | 6/1980 | Germany . |
| 2923036 | 12/1980 | Germany . |
| 2040801 | 9/1980 | United Kingdom . |

*Primary Examiner*—C. Scott Bushey
*Attorney, Agent, or Firm*—Fernando A. Borrego

[57] ABSTRACT

A fiber composite is produced by continuously pressing together a thermoplastic melt and a glass fiber mat or tape in a double belt press and cooling the composite under pressure. The double belt press is sealed off on both sides by endless, traveling belts made of a compressible material.

26 Claims, 1 Drawing Sheet

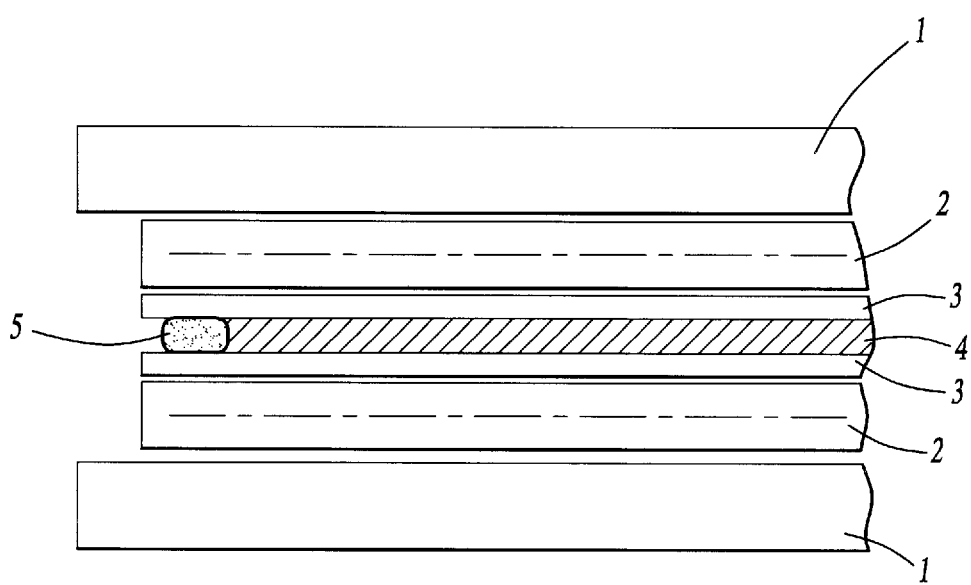

PRODUCTION OF FIBER COMPOSITE

This application is a continuation of application Ser. No. 08/395,358, filed Feb. 28, 1995, now abandoned, which is a continuation of application Ser. No. 07/623,567, filed Dec. 7, 1990, now abandoned.

FIELD OF THE INVENTION

The present invention relates to a process for producing a fiber composite composed of a thermoplastic matrix and a glass fiber mat or scrim.

Fiber composites based on thermoplastics are increasingly used in automotive construction. It is therefore necessary to develop inexpensive, high-throughput processes for producing such composites.

GB-A-2 040 801 describes a process for producing a glass fiber reinforced thermoplastic plate. In said process, needled fiber mats and a molten thermoplastic are pressed together and consolidated in a double belt press to form a fiber reinforced sheet. The comparatively low pressure employed is sufficient to ensure complete impregnation of the loose glass mats without the inclusion of air bubbles.

However, it has been found that using this process it is hardly possible to manufacture sheets of uniform shape and structure across their entire width with sufficient reproducibility. Time and again, sheets are obtained with thickness fluctuations, in particular at the edge, and also with nonuniform glass and matrix distribution. These defects appear in particular on impregnating the glass fiber mats with thermoplastics of low viscosity, eg. polypropylene, or on using thermoplastics which need to be processed at higher temperatures, eg. polyamide.

It is an object of the present invention to eliminate the defects mentioned and to develop a rapid and economical process for producing uniform sheets from fiber composite materials.

We have found that this object is achieved by a process for producing a fiber composite material composed of a thermoplastic matrix and a glass fiber mat or tape, in which a thermoplastic and a glass fiber mat or tape are continuously introduced into a double belt press and pressed together therein at a temperature above the melting point of the thermoplastic before the composite is cooled under pressure, wherein the double belt press is sealed off on both sides by an endless, traveling belt made of a compressible material.

The lateral sealing by means of the traveling belt has the effect of limiting the outward flow of the impregnated glass fiber mat or tape during compression; in the event of an increase in pressure due to an oversupply of melt or glass fiber in consequence of a production problem, the flexible belt, which is guided by friction can escape and damage to the prepreg is prevented. Another beneficial effect is the high temperature constancy across the width of the prepreg and hence across the width of the sheet product.

SUMMARY OF THE INVENTION

The prefferred starting material for the process is a customary glass fiber mat, preferably with a weight per unit area of from 150 to 1200 g·m$^{-2}$. The mat can be of the conventional needled or binder bonded type. It is also possible in principle to use a glass fiber tape in the form of unidirectionally oriented filaments.

BRIEF DESCRIPTION OF THE DRAWING

The drawing illustrates a cross-section of an endless double band press with restraining endless traveling belts.

DESCRIPTION OF THE PREFERRED EMBODIMENTS

Suitable thermoplastics are the customary polymers, such as polyolefins, polyamides, thermoplastic polyesters, polysulfones, polyether ketones, polyether imides, polyphenylene sulfide and mixtures thereof. Preference is given to using a polypropylene having an MFI of from 6 to 300 g/10 min (at 230° C./2.16 kg). The ratio of thermoplastic to glass fiber is chosen in such a way that the glass content of the ready-produced prepreg is preferably 20–50% by weight.

The thermoplastic material can be fed into the double belt press in various forms. It is preferably fed in as an extruded melt; but it is also possible to feed films or a combination of a melt and a film which is then melted in the intake zone of the press.

Inside the double belt press, the fiber bundles are impregnated with the thermoplastic melt. This takes place at a pressure of from 0.1 to 10 bar, preferably of from 1 to 5 bar. In the case of glass fiber tapes it is also possible to use higher pressures of up to 50 bar. The temperature should be sufficiently high for the thermoplastic to be in melt form; that is, it should be more than 10° C., preferably from 20° to 120° C., above the melting point of the thermoplastic. The residence time in the double belt press is from 30 seconds to 20 minutes, preferably from 2 minutes to 10 minutes. The double belt press has a cooling zone in which the composite is consolidated by cooling to below the melting point of the thermoplastic.

According to the present invention, the double belt press is sealed off on both sides by endless, traveling belts made of a compressible, preferably elastomeric material. The diagram shows a cross-section through such a double belt press. (1) denotes the heating or chilling plates, (2) the rolls for the steel belts (3), (4) the impregnated glass fiber mat and (5) the traveling side belt. At the point of exit from the double belt press a roller guide pulls the sealing belts away from the ready-produced prepreg in the upward direction or alternatively in the downward direction; in the course of which operation they are advantageously freed from adherent, brittle thermoplastic residues by flexing movements. Then the belts are fed tensioned and under sideways control back into the inlet point of the press. They are driven positively via the steel belts.

The traveling belts are made of compressible, preferably elastomeric material. Suitable for this purpose are for example thick sisal or hemp ropes, natural or synthetic rubber, silicone rubber, polyurethane rubber and compressible plastics, eg. polytetrafluoroethylene or polypropylene. The rubbers or plastics can be reinforced with fibers, for example glass fibers, carbon fiber fabrics or polyester fabrics, to improve the stability. In principle it is also possible to use soft metals, such as lead, and thin steel belts which are coated with a plastic material. The choice of compressible material is dictated by the expected mechanical and thermal stresses. The thickness of the belts depends on the distance between the steel belts and hence on the desired thickness of the composite product. It is generally from 3 to 15 mm, preferably from 5 to 10 mm.

The composite materials produced according to the present invention are suitable for use as prepregs from which it is possible to manufacture, by forming and pressing, structural components which can be used in various areas, for example automobiles, sports goods, furniture, etc.

We claim:

1. A process for producing a thermoplastic prepreg containing glass fiber reinforcement comprising the steps of:

continuously and separately introducing thermoplastic and glass fiber mat or tape into a double band press sealed on both sides by endless traveling belts located within the bands of said double band press and made of a compressible silicone rubber containing fiber reinforcement, pressing together said thermoplastic and said glass fiber mat or tape at a temperature above the melting point of the thermoplastic, wherein said endless traveling belts move laterally limiting outward flow of said thermoplastic and glass fiber mat or tape during an oversupply of said thermoplastic or glass fiber mat or tape, and cooling the product thus prepared under pressure to a temperature below the melting point of said thermoplastic.

2. A process as defined in claim 1, wherein the thermoplastic and the glass fiber mat are pressed together at a pressure of from 1 to 5 bar at a temperature which is from 20° to 120° C. above the melting point of the thermoplastic.

3. A process as recited in claim 1, wherein the residence time in the double belt press is from 2 minutes to 10 minutes.

4. A process as recited in claim 2, wherein the residence time in the double belt press is from 2 minutes to 10 minutes.

5. A process as recited in claim 1, wherein the thermoplastic is polypropylene.

6. A process as recited in claim 4, wherein the thermoplastic is polypropylene.

7. A process as recited in claim 1, wherein the process further comprises pulling said endless traveling belts made of compressible silicone rubber containing fiber reinforcement away from lateral edges of the prepreg in an upward or downward direction and flexing said endless traveling belts made of compressible silicone rubber containing fiber reinforcement thereby freeing said endless traveling belts made of compressible silicone rubber containing fiber reinforcement from adherent thermoplastic residue.

8. A process for producing a thermoplastic prepreg containing glass fiber reinforcement comprising the steps of:

continuously and separately introducing thermoplastic and glass fiber mat or tape into a double band press sealed at its lateral edges by endless traveling belts disposed between the bands of said double band press and made of a compressible silicone rubber containing fiber reinforcement;

pressing together said thermoplastic and said glass fiber mat or tape at a temperature above the melting point of the thermoplastic, impregnating said fiber mat or tape with said thermoplastic, wherein said endless traveling belts move laterally to escape during an oversupply of said thermoplastic or said glass fiber mat or tape, limiting outward flow of said thermoplastic and glass fiber mat or tape with said endless traveling belts during said oversupply and preventing thickness fluctuations of said thermoplastic-impregnated fiber mat or tape; and cooling thermoplastic-impregnated fiber mat or tape under pressure to a temperature below the melting point of said thermoplastic.

9. A process as defined in claim 8, wherein said thermoplastic and said glass fiber mat are pressed together at a pressure of from 1 to 5 bar at a temperature which is from 20° to 120° C. above the melting point of the thermoplastic.

10. A process as recited in claim 8, wherein the residence time in said double belt press is from 2 minutes to 10 minutes.

11. A process as recited in claim 9, wherein the residence time in said double belt press is from 2 minutes to 10 minutes.

12. A process as recited in claim 8, wherein said thermoplastic is polypropylene.

13. A process as recited in claim 11, wherein said thermoplastic is polypropylene.

14. A process as recited in claim 8, wherein the process further comprises pulling said endless traveling belts made of compressible silicone rubber containing fiber reinforcement away from lateral edges of the prepreg in an upward or downward direction and flexing said endless traveling belts thereby freeing said endless traveling belts from adherent thermoplastic residue.

15. A process for producing a thermoplastic prepreg containing glass fiber reinforcement comprising the steps of:

providing a double band press having opposed bands each having lateral edges, said band press being sealed at said lateral edges by endless traveling belts disposed between said bands adjacent said lateral edges, said endless traveling belts made of a compressible silicone rubber containing fiber reinforcement;

continuously and separately introducing thermoplastic and glass fiber mat or tape into said band press between said bands;

pressing together said thermoplastic and said glass fiber mat or tape at a temperature above the melting point of said thermoplastic-impregnating said fiber mat or tape with said thermoplastic, thereby producing a thermoplastic impregnated fiber mat, wherein said endless traveling belts move laterally during an oversupply of thermoplastic or glass fiber mat or tape limiting outward flow of said thermoplastic and glass fiber mat or tape and preventing thickness fluctuations of said thermoplastic-impregnated fiber mat; and cooling said thermoplastic-impregnated fiber mat under pressure to a temperature below the melting point of said thermoplastic.

16. A process as defined in claim 15, wherein said thermoplastic and said glass fiber mat are pressed together at a pressure of from 1 to 5 bar at a temperature which is from 20° to 120° C. above the melting point of the thermoplastic.

17. A process as recited in claim 15, wherein the residence time in said double belt press is from 2 minutes to 10 minutes.

18. A process as recited in claim 16, wherein the residence time in said double belt press is from 2 minutes to 10 minutes.

19. A process as recited in claim 15, wherein said thermoplastic is polypropylene.

20. A process as recited in claim 18, wherein said thermoplastic is polypropylene.

21. A process as recited in claim 1, comprising introducing said thermoplastic as an extruded melt.

22. A process as recited in claim 8, comprising introducing said thermoplastic as an extruded melt.

23. A process as recited in claim 15, comprising introducing said thermoplastic as an extruded melt.

24. A process as recited in claim 6, wherein said polypropylene has a melt flow index (MFI) of from 6 to 300 g/10 min (at 230° C./2.16 kg).

25. A process as recited in claim 13, wherein said polypropylene has a melt flow index (MFI) of from 6 to 300 g/10 min (at 230° C./2.16 kg).

26. A process as recited in claim 20, wherein said polypropylene has a melt flow index (MFI) of from 6 to 300 g/10 min (at 230° C./2.16 kg).

* * * * *